United States Patent [19]

Norbom et al.

[11] Patent Number: 4,906,136
[45] Date of Patent: Mar. 6, 1990

[54] METHOD FOR CONNECTING A CONDUIT TO A SUBSEA STRUCTURE, AND A DEVICE FOR USE IN CONNECTING A CONDUIT END TO A SUBSEA STRUCTURE

[75] Inventors: Erik Norbom, Baerum Verk; Rune Sletten, Nesoddtangen, both of Norway

[73] Assignee: Kvaerner Subsea Contracting A/S, Lysaker, Norway

[21] Appl. No.: 206,202

[22] Filed: Jun. 13, 1988

[30] Foreign Application Priority Data

Jun. 16, 1987 [NO] Norway .................................. 872508

[51] Int. Cl.[4] ............................. F16L 1/04; B63C 11/52
[52] U.S. Cl. ........................................ 405/169; 405/191
[58] Field of Search ................ 405/169, 170, 185, 188, 405/190, 191; 166/343, 344, 347

[56] References Cited

U.S. PATENT DOCUMENTS

| | | | |
|---|---|---|---|
| 3,795,115 | 3/1974 | Bergquist et al. | 405/170 |
| 4,041,719 | 8/1977 | Baugh | 405/169 |
| 4,086,778 | 5/1978 | Latham et al. | 405/169 X |
| 4,601,608 | 7/1986 | Ahlstone | 405/169 |

*Primary Examiner*—David H. Corbin
*Attorney, Agent, or Firm*—Merchant, Gould, Smith, Edell, Welter, & Schmidt

[57] ABSTRACT

The invention relates to a method for connecting a conduit (5) to a subsea structure (1), which comprises laying the conduit on the sea floor, with a conduit end (8) in the area close to the subsea structure. The method is characterized in that the conduit end is gripped by a ROV (9) with a gripping manipulator (10), that ROV (9) with the gripped conduit end (8) is advanced to the subsea structure (1), that the conduit end is introduced like a piston in a suitable receiving member (2) in the subsea structure, and that a negative pressure is provided in the receiving member so that conduit end (8) is sucked into the receiving member (2). The invention also relates to a device for use in connecting a conduit end (8) to a subsea structure (1). Conduit end (8) is advanced from the side of subsea structure (1) into a receiving member (2) of the subsea structure and is secured there. Receiving member (2) and conduit end (8) are mutually adapted so that conduit end (8) can move like a piston in receiving member (2). The receiving member has a connecting sleeve which is accessible from outside for connection to a source of negative pressure.

8 Claims, 5 Drawing Sheets

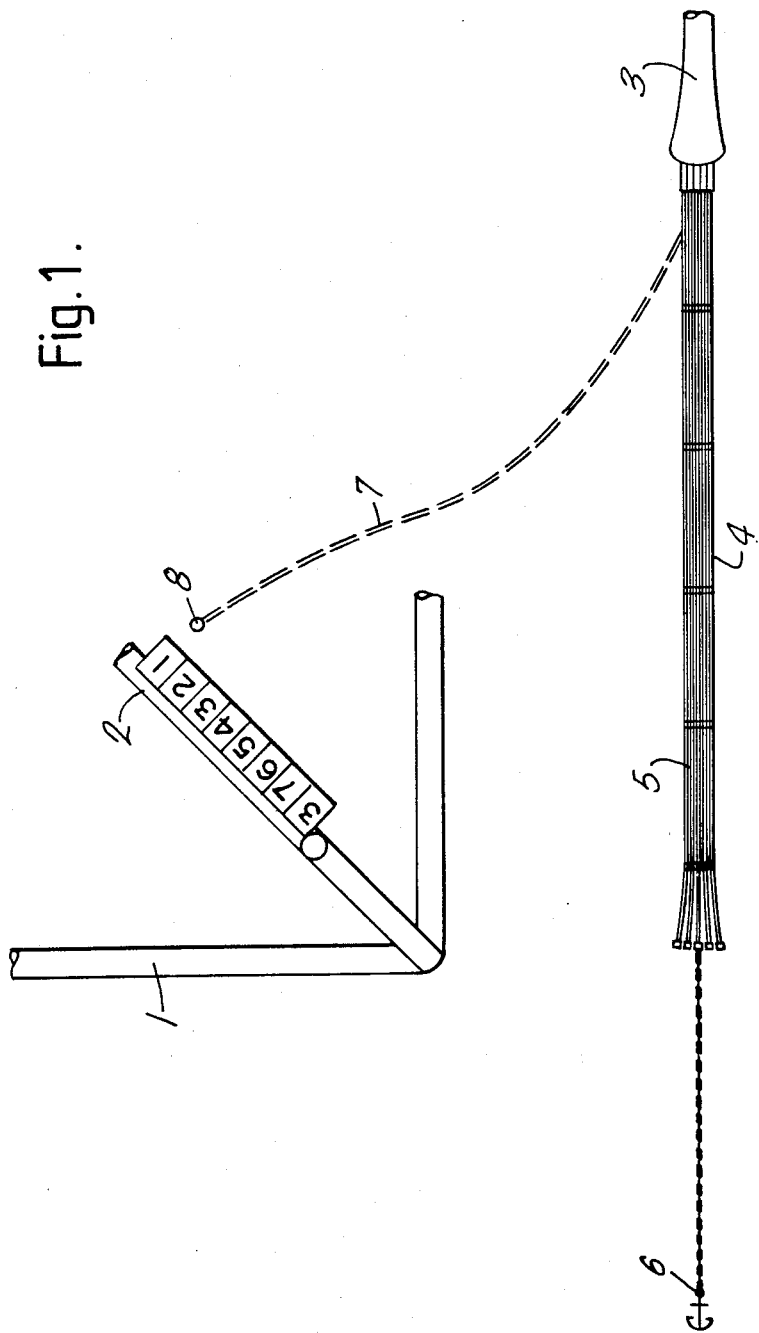

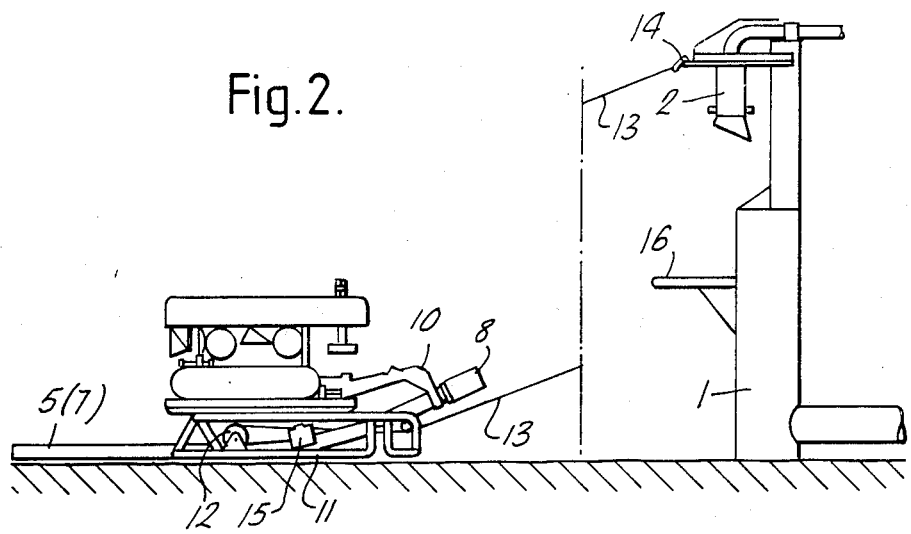
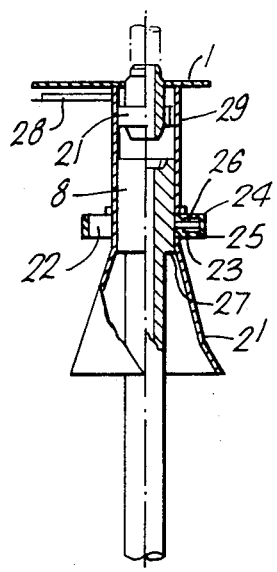
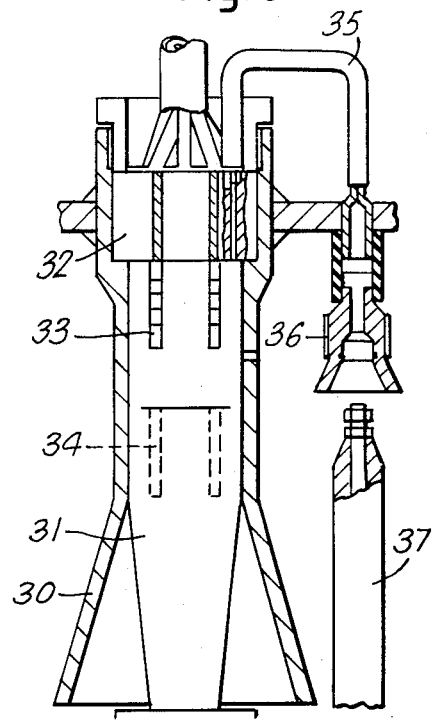

METHOD FOR CONNECTING A CONDUIT TO A SUBSEA STRUCTURE, AND A DEVICE FOR USE IN CONNECTING A CONDUIT END TO A SUBSEA STRUCTURE

FIELD OF THE INVENTION

The invention relates to a method for connecting a conduit to a subsea structure, including laying the conduit on the sea floor, with an end of said conduit located in the area of the subsea structure.

The invention also relates to a device for use in connecting a conduit end with a subsea structure, said conduit end being inserted into a receiving member of the subsea structure and being attached there.

BACKGROUND OF THE INVENTION

It is known to use a winch and a special pull-in connection to connect a conduit with a subsea structure. Such a conduit, which may be a pipeline, a power cable, a signal cable, a hydraulic hose, etc., is provided with one end in the area of the subsea structure. The conduit is connected to a rope from the winch, and by the aid of said winch the conduit is pulled into a suitable receiving member of the subsea structure. This known system is operated from the surface by guide line control. The system is complicated, vulnerable to weather influence, and requires a very stable surface vessel capable of maneuvering guidelines.

Smaller conduits may, obviously be laid in place by divers, but such a manual method would be unsuitable in case of larger water depths.

There is, thus, a demand for new technology for use when a conduit is to be connected with a subsea structure.

SUMMARY OF THE INVENTION

It is an object of the invention to use a remote operated vehicle, below called ROV. A ROV, however, has limited traction and lifting power. According to the invention a method is, thus, suggested as mentioned above, which is characterized by the fact that the leading end is gripped by a ROV comprising a gripping manipulator, that said ROV with the gripped conduit end is advanced to the subsea structure, that the conduit end is introduced like a piston into a suitable receiving member of the subsea structure, and that a vacuum is provided in the receiving member so that the conduit end is sucked into said receiving member.

By the aid of such a new method a ROV may be used in spite of its limited traction and lifting power. By using a ROV operations are made independent of weather and sea depth, and operating costs are reduced to fewer days.

Towing the conduit end up to the receiving member can indeed be so demanding that the ROV is unable to do it, but according to the invention a cable from a winch on the ROV is attached to the subsea structure, and then the ROV with a conduit end gripped by said ROV is pulled towards the subsea structure with the cable being wound onto the winch drum.

When arriving at the subsea structure the ROV may advantageously connect with said structure, and the gripped conduit end is then inserted into the receiving member by the aid of the gripping manipulator.

The method is especially advantageous if steps are taken to provide a negative pressure by the aid of a pump on the ROV with the pump inlet connected to the receiving member.

By this invention a method is, thus, provided which permits the subsea structure to be completely passive, and the advantages of a ROV to be utilized, viz. complete independence as regards weather conditions, and especially independence of the depth of the subsea structure. According to a special variant of the method advancing a conduit end to the receiving member of the subsea structure is carried out by the aid of a ROV, the conduit end being connected to a piston in a cylinder in said subsea structure, which is attached to the subsea structure, whereafter a negative pressure is provided in the cylinder so that the piston is sucked into the receiving member and pulls along the conduit end into said receiving member. This variant will be of interest when the conduit is too heavy and rigid, and requires more suction force which may be achieved by suitable dimensions of the piston.

Suction force will always be determined by the differential pressure and the area influenced by it. Suction force may be controlled in a simple manner by suitable control of the pump.

According to the invention a device for use in connecting a conduit end with a subsea structure is also provided. The conduit end is introduced from the side of the subsea structure into a receiving member of the subsea structure and is secured there. A device according to the invention is characterized by the fact that the receiving member and the conduit end are mutually adapted so that the conduit end can move like a piston in the receiving member, and that the receiving member has a coupling accessible from the outside for connection with a source of negative pressure. The source of negative pressure is preferably provided on a ROV.

In a variant of the device the receiving member is connected with a cylinder with a piston to which the conduit end may be connected, said cylinder having a coupling which is accessible from the outside for connection with a source of negative pressure.

BRIEF DESCRIPTION OF THE DRAWINGS

The invention is now disclosed in more detail with reference to the drawing, in which FIG. 1 shows an area of a sea floor with part of a subsea structure provided in said area, and a conduit end laid in the vicinity to the latter, FIG. 2 shows an elevation of part of the subsea structure, and a ROV, FIG. 5 is a sectional view through a possible embodiment of a receiving member for a pipeline end, FIG. 6 is a sectional view through a possible embodiment of a receiving member for an electric cable.

DETAILED DESCRIPTION OF THE PREFERRED EMBODIMENT

Figure 3:
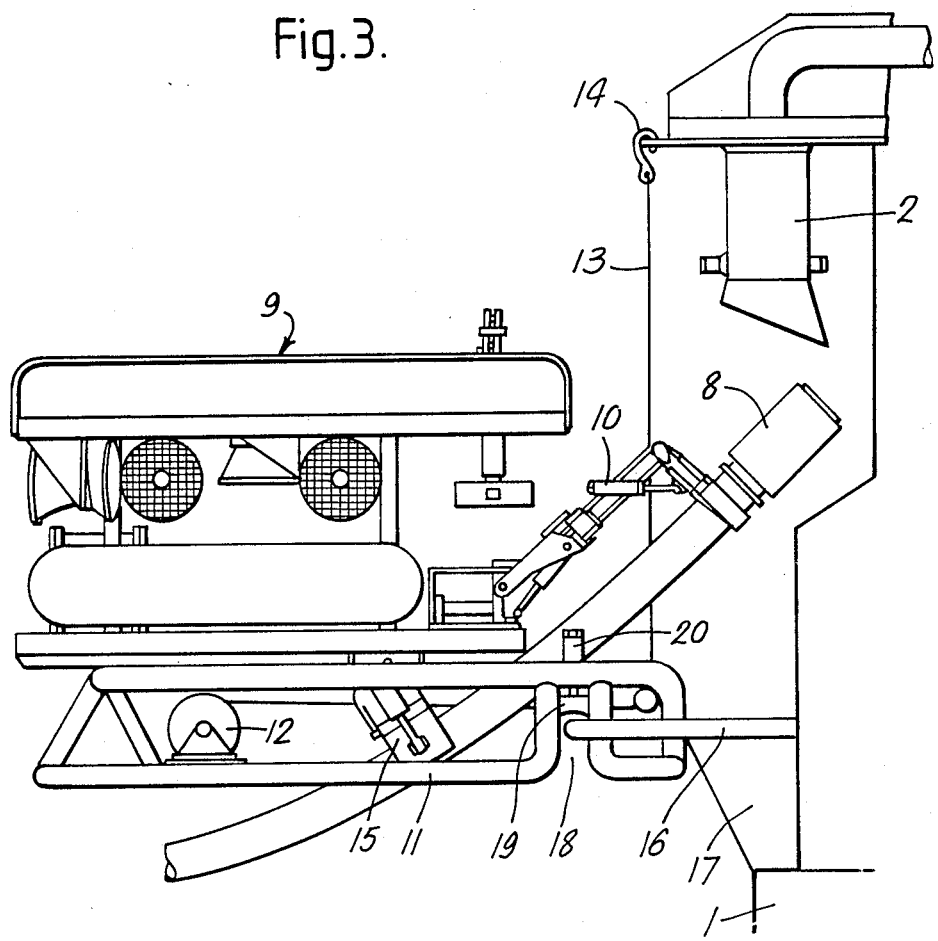
FIG. 3 shows a sectional view of the subsea structure of FIG. 2 in an enlarged scale with the ROV advanced and connected to the subsea structure.

FIG. 1 shows a sectional view of a subsea structure 1 comprising a number of receiving members 2 for connecting conduits. In FIG. 1 a bundle of pipelines 3 is also shown with the end of said bundle being split up into a number of separate conduits 5. One end of the bundle of pipes is anchored to the sea floor by the aid of an indicated anchor 6. One conduit 7 is shown to be bent from bundle 3,4, and its end 8 is extended to a receiving member 2 in the subsea structure.

FIG. 1 shows the general technology used when a conduit is connected with a subsea structure. In the present case a bundle of pipes 3,4 is laid on the sea floor with the end area 4 on one side or in the vicinity of the subsea structure. In a manner not shown, a conduit 7 being part of the bundle of pipelines was moved to a receiving member 2 of the subsea structure. The present invention relates to the process of fetching such a conduit 7, supplying is so a receiving member 2 of the subsea structure, and then inserting the conduit in said receiving member.

As shown in FIG. 2, a remote operated subsea vessel 9, a so called ROV, is moved to a position above a conduit 5 (7). The ROV is provided with a gripping manipulator 10 which is gripping conduit end 8.

In bottom frame 11 of ROV 9 a winch 12 is provided. A rope 13 from winch 12 was pre-connected by the aid of the ROV to the subsea structure at 14, close to the receiving member 2 into which pipeline end 8 is to be inserted.

The ROV shown in FIG. 2 may be of the kind known as Super Scorpio, or a corresponding ROV. Such a ROV has limited traction and lifting power. Traction and lifting power amount to 200 kp in an arbitrary direction, and up to 300 kp in the forward direction. This power is, however, mostly needed for piloting the ROV. Winch 12 is, thus, utilized to pull in the ROV to the subsea structure with the conduit gripped by the gripping manipulator. When dimensioning winch 12 it will be suitable to use the heaviest expected lift for a starting point, presumably handling of a well flow pipe or a water injection pipe. A flexible pipe filled with water and with an inside diameter of approximately 15 cm, e.g., weighs approximately 60 kp/m when submersed in water. The minimum bending radius of a common flexible pipe of this dimensions will be approximately 3–4 m. A ROV should at least be able to tow a length of such a pipe corresponding to half a circular arc, i.e., 10–12 m or 0.6–0.8 tons. A winch 12 having a traction of 2 tons may, thus, be suitable.

Towing conduit end 8 to receiving member 2 of the subsea structure 1 in FIG. 2 is carried out by ROV 9 which grips conduit end 8 with its gripping manipulator 10, as well as by a pipe jaw 15 provided below the ROV, in the area inside bottom frame 11. Then the ROV is then driven upwards by pushing force, at the same time as winch 12 is operated to pull the vessel with the gripped conduit end towards the location for connection, i.e. receiving member 2 of the subsea structure.

On most sea floors this will cause more or less complete loss of visibility due to sediments being whirled up. Vessel 9 should, thus, preferably be lifted at least 3 m above the sea floor when pulled in. In the embodiment shown in FIG. 2 this was taken into consideration and the point of connection 14 of rope 13 on the subsea structure is placed correspondingly high above the sea floor.

By the aid of winch 12 and the power from propulsion means on the vessel ROV 9 is now advanced upwards and towards subsea structure 1, to a position with the leading end of bottom frame 11 located just above rung 16 on subsea structure 1, in the area below receiving member 2. By use of winch 12 and the propulsive system bottom frame 11 is then placed on rung 16, as shown in FIG. 3.

Each rung 16 is shaped as a horizontal pipe ring supported by brackets 17. Bottom frame 11 of vessel 9 is provided with a groove 18 receiving the ring-shaped rungs 16, as shown in FIG. 3. Any desired adjustment of level may be carried out by the aid of an adjusting means provided in groove 18 and comprising a thrust block 19 connected with a piston in a fluid power cylinder 20. The engagement with rungs 16 will form a point of attachment or fulcrum for vessel 9. When vessel 9 has maneuvred into a correct position by using the propulsion units, winch, and if desired the level adjustment means 19,20, pipe jaw 15 is released and conduit 8 is moved into the position shown in FIG. 4 by the aid of gripping manipulator 10. Then conduit end 8 can be inserted into funnel 2 like a piston. Now a source of negative pressure, e.g., a pump in ROV 9 is connected in a manner not shown, to a connecting point on funnel 2 to provide negative pressure inside said funnel. Thus, a suction force is generated which will pull conduit end 8 into the funnel where the conduit end can be locked in a manner known per se. A practical example is shown in FIG. 5.

Figure 4:
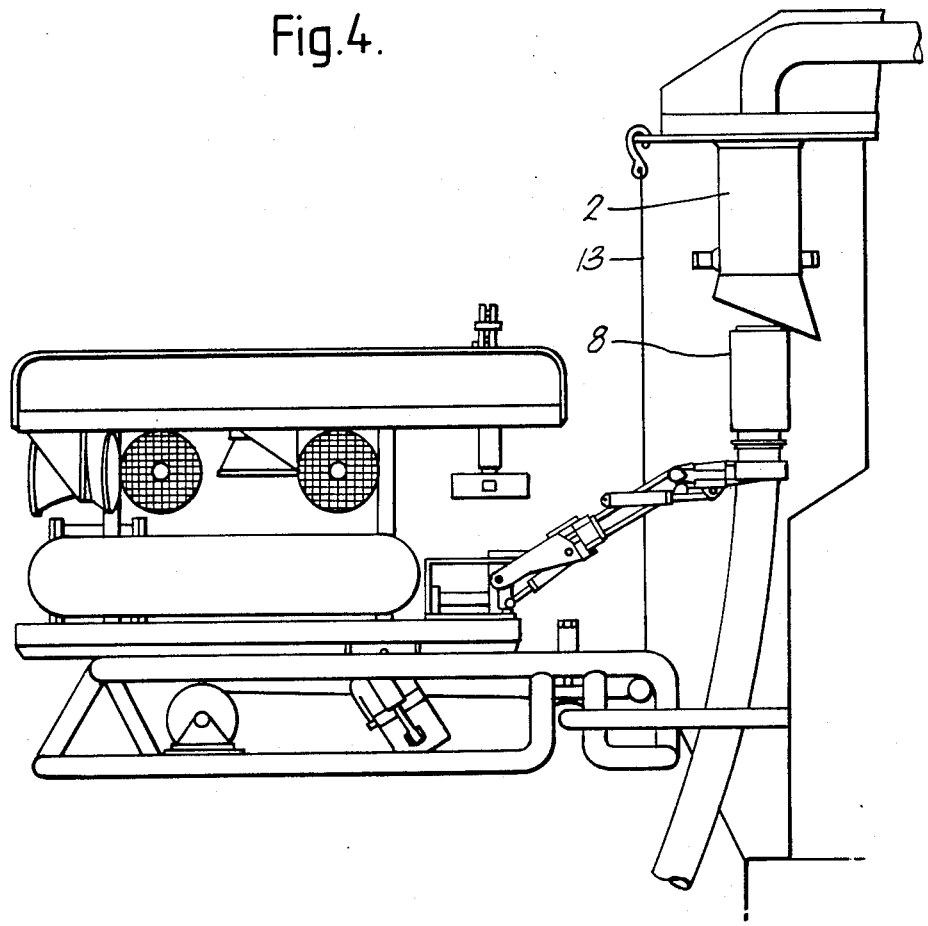
FIG. 4 shows the same situation as does FIG. 3, but with the conduit end gripped by the ROV guided inwards to a receiving member of the subsea structure.

Funnel 2' shown in FIG. 5 substantially corresponds to funnel 2 shown in FIGS. 2–4. Inside funnel 2' a connection half 21 is provided and is adapted for cooperation with conduit end 8 which is inserted into funnel 2' and, thus, acts as the other connection half. In this case the funnel comprises two mechanical locks 22. Each mechanical lock comprises a locking wedge 23 which is provided in a casing and is influenced by a compression spring 25 which is provided between the bottom end of the casing and a collar 26 on locking wedge 23. When end portion 8 passes locking wedge 23 the latter is pushed radially inwards by spring 25 to lock against shoulder 27 on end portion 8.

A conduit 28 extends from the space in the funnel behind connection half 21 to a connecting sleeve which can be connected to a pump in vessel 9.

Suction force will be built up inside the funnel as soon as conduit end 8 enters suction funnel, and the cross section of flow is sufficiently restricted to cause a pressure drop. A radial clearance of approximately 1 mm is assumed to be satisfactory between the cylindric portion of the funnel and the conduit end. In order to control friction and provide a certain flexibility of the cross section of flow the conduit end may be greased.

If it is desired to release conduit end 8 hydraulic pressure may be supplied through an indicated conduit 29. Such hydraulic pressure will enter the space to the left of collar 26 and push locking wedge 23 outwards, so that the conduit end is released and may be removed from the funnel.

FIG. 6 shows a funnel 30 intended for insertion of an electric cable 31. A connection member 32 with pins 33 is provided inside funnel 30. Corresponding sockets 34 to receive pins 33 are provided in the shown head of cable 31. Water may be emptied from the space between member 32 and cable head 31 through a conduit 35 extending to a connection sleeve 36. A connection member 37 which is connected to a conduit extending to the pump of the vessel may be introduced into connection 36 by the aid of a gripping manipulator. As in FIG. 5 cable head 31 will be sucked into the receiving member.

Especially in connection with connecting electrical contacts, as shown in FIG. 6 it may also be of interest to connect additional equipment for scavenging the connection area. This is not shown, since such equipment and its performance is well known to those skilled in the Art.

The above mentioned pump (not shown) which may advantageously constitute a component in vessel 9, may in a typical embodiment be a screw pump with a nominal capacity of 70 l/min., and a pressure rise of 16 bar. At a depth of 200 m or more such a pump will be fully utilized. The pumping effect will be approximately 4 kW in such a case.

The suction force is obviously determined by the differential pressure and the area on which the force can act. For a pipe with a diameter of 30 cm which is filled with water the suction force will be approximately 11 tons at a differential pressure of 16 bar.

Figure 7:
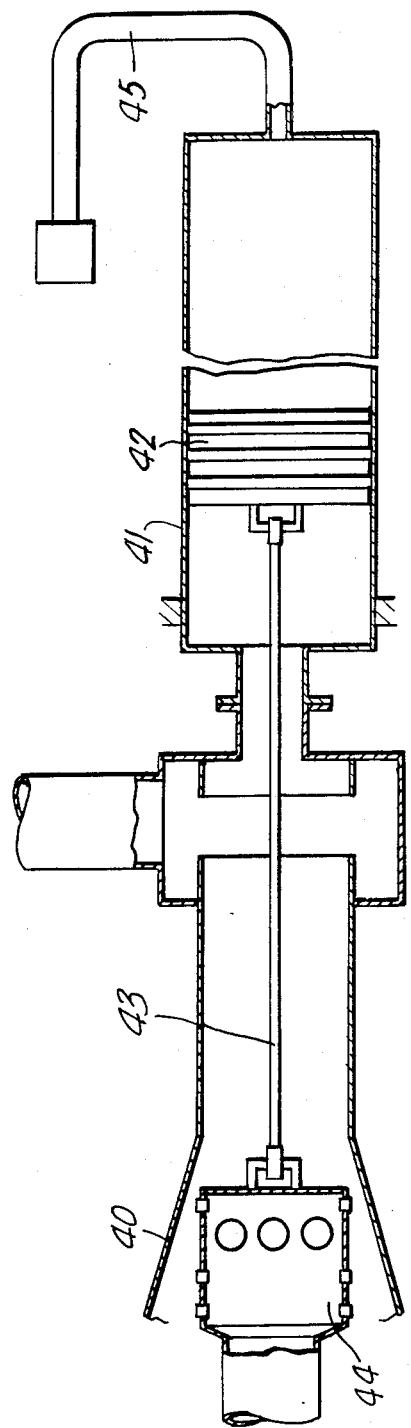
FIG. 7 is a diagrammatical view of a variant comprising a suction piston for pulling in a conduit end into a receiving member of a subsea structure.

If the pipeline to be connected is too heavy and rigid to be towed by a ROV the method shown in FIG. 7 may be used. Here a horizontal funnel 40 may be used the projection of which is connected with a cylinder 41. In the cylinder there is a piston 42. The piston is connected with a rope 43 which passes out through funnel 40 and can be attached to the shown conduit end 44. Through a conduit 45 the space behind the piston can be emptied and piston 42 will, thus, move to the right in Figure 7 and pull conduit end 44 along into funnel 40. Such a design is advantageous because the suction force is increased. A piston diameter of 0.5 will for instance provide approximately 30 tons suction force at a differential pressure of 16 bar. Said force may be achieved by use of the above mentioned and indicated screw pump aggregate of 4 kW in the ROV.

We claim:

1. A method for connecting a conduit end to an underwater structure using a remote operated vehicle, the structure having a suction funnel and connecting means for receiving and connecting to the conduit end, the method comprising the steps of:
   (a) placing a conduit underwater near the underwater structure;
   (b) gripping the conduit using a gripping manipulator on the remote operated vehicle;
   (c) moving the remote operated vehicle and the gripped conduit to the underwater structure;
   (d) introducing the conduit end into the suction funnel; and
   (e) applying a negative pressure within the suction funnel so as to draw the conduit into the connecting means.

2. A method according to claim 1, wherein a piston is attached to the conduit end and the applying step draws the piston and the attached conduit into the connecting means.

3. A method according to claim 1, wherein a rope is attached to the underwater structure, the remote operated vehicle includes a winch attached to the rope, and the moving step includes the step of winding the rope onto the winch.

4. A method according to claim 1, wherein the introducing step is performed by the gripping manipulator.

5. A method according to claim 1, wherein the applying step includes the step of supplying a negative pressure from a pump on the remote operated vehicle.

6. An apparatus for connecting a conduit end to an underwater structure, comprising:
   (a) receiving means for receiving a conduit end, wherein said receiving means is substantially funnel shaped and is adapted so as to slidably receive the conduit end;
   (b) connection means attached to said receiving means for connecting said receiving means to a source of pressure so as to control the pressure within said receiving means; and
   (c) pressure control means for providing a negative pressure so as to draw a conduit end into said receiving means.

7. An apparatus according to claim 6, further comprising piston means attached to the end of the conduit and adapted so as to be slidably received within said receiving means, wherein said pressure control means draws said piston means and the conduit into said receiving means.

8. An apparatus according to claim 6, further comprising a remote operated vehicle, and wherein said pressure control means is attached to said remote operated vehicle.

* * * * *